Jan. 10, 1933.　　　　　A. BALIAN　　　　　1,893,513
METHOD AND MEANS FOR MAKING A COATED FROZEN CONFECTION
Filed April 11, 1932
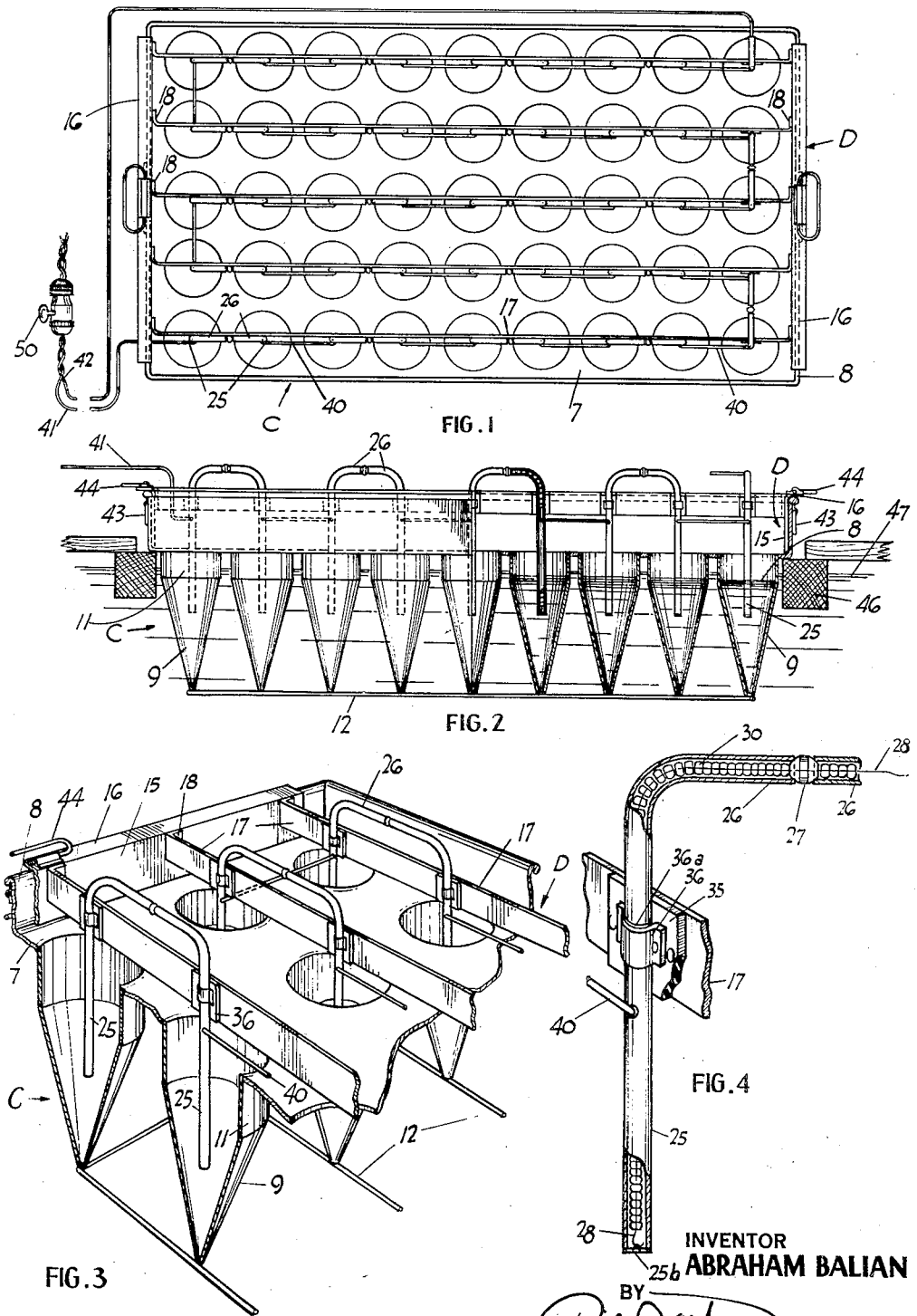
INVENTOR
ABRAHAM BALIAN
BY
ATTORNEY Patented Jan. 10, 1933

1,893,513

UNITED STATES PATENT OFFICE

ABRAHAM BALIAN, OF LOS ANGELES, CALIFORNIA

METHOD AND MEANS FOR MAKING A COATED FROZEN CONFECTION

Application filed April 11, 1932. Serial No. 604,464.

This invention relates to a method of and means for making a coated frozen confection.

A primary object of the invention is to provide an apparatus for the above mentioned purpose whereby an easy release of the confection is had from the means whereby it is lifted from the mold in which it is frozen.

The means just mentioned is of a sanitary nature because, at no time during the operation is it necessary for the attendant to touch the confection while it is being manufactured.

A further object is in providing means to electrically heat the element to which the confection has previously been frozen, for the purpose of disconnecting said element from the confection in order that it may thereupon drop therefrom into a suitable container or carrier in which it is delivered to the consumer.

Still another object of the invention is to provide improved means for the production of coated frozen confections in larger numbers per unit of time.

Yet another object of the invention is to provide a frozen coated confection which when completed will have formed therein a recess or socket into which a suitable handling member may be inserted whereby to support the confection while it is being eaten.

A still further object is to provide a novel method of and means for freezing the confection to a part which has been inserted into it before it has been congealed, then subjecting the confection to a reduced temperature whereby it is frozen to said part, then bodily transferring said part together with said confection frozen thereto to a bath of edible material wherewith said confection is coated, and then heating said part to detach said confection therefrom, thus leaving in the confection a socket suitable for having a handling element inserted thereinto.

Other objects, advantages and features of invention may hereinafter appear.

Referring to the accompanying drawing, which illustrates what is at present deemed to be a preferred embodiment of the invention, Fig. 1 is a plan of the assembled mold and set of heating elements together with their supporting frame.

Fig. 2 is a side elevation, a portion of which is shown in section.

Fig. 3 is a fragmentary perspective view of the mold and heating element frame.

Fig. 4 is a side elevation, partly in section, of one of the heating elements, showing the adjacent portion of its attaching frame.

Referring in detail to the drawing, the apparatus comprises two main parts, the mold member C within which a plurality of the confections are contained for being congealed and for a time thereafter, and the transfer means D whereby the confections, after being frozen, are transferred to the coating means, not separately shown, said coating means, separately considered, not forming any part of the invention.

In the embodiment of the invention illustrated by way of example in the drawing, the mold member comprises a tray member having a bottom or base plate 7 surrounded by an upstanding flange 8. A set of conical containers 9 depend from said plate 7, the upper portion 11 of each of these containers being shown as of a cylindrical character, the top of which opens out through the plate 7, said containers or cups being secured to said plate in any suitable manner or, possibly, made integral therewith. The downwardly directed apices of these containers all occupy substantially the same horizontal plane, being braced by tie rods 12.

The transfer member D comprises a removable frame having oppositely disposed marginal or side plates 15 with outwardly directed flanges 16 which may rest upon the upper edges of the upstanding flanges 8 of the container means. The frame of the transfer member also includes the transverse plates or supports 17 having flanged end portions 18 which are soldered or otherwise secured to the inner faces of the marginal plates 15. Said supports 17 are arranged in spaced, substantially parallel relation to each other.

The downwardly extended, elongated elements 25 are arranged to be electrically heated and are shown arranged in pairs, each pair forming the limbs of a tubular member of an inverted U shape, said tubular member, however, not being quite continuous, but its upper portion consisting of two arms 26 which are directed towards each other, but which are slightly separated from each other by a spacing bead 27 (Fig. 4.) through which extends the conducting wire 28 which is housed within the aforesaid tubular parts 25 and 26. Said bead 27 is made of insulating material, a multiplicity of smaller insulator beads 30 being provided within the tubular parts 25 and 26 to insulate the wire 28.

Each of the aforesaid tubular members 25 is secured in an upstanding position to the supporting plate 17 in any preferred insulated manner, as by the clips 36 which are riveted or otherwise secured to the flat supporting bars 17, said clips tightly gripping together with the semicylindrical insulation linings 36a.

The tubes 25 are electrically heated by conductivity from the resistance wires 28. The wires 40 are connected with the tubes 25 sufficiently far above the lower ends of said tubes not to interfere with placing the transfer assembly D in the operative position wherein it is shown in Figs. 1 and 3.

The mold number C is shown provided with handles 43 and the transfer member D has handles 44.

The tubes 25 are hooked up in a suitable series, or parallel, or series parallel to agree with the applied voltage.

In Fig. 2 is also shown the side pieces 46 of the usual refrigerating tank containing the congealing liquid 47. The containers 9 are shown filled to the desired extent with the confection bodies 48.

The preferred arrangement of the electrical connections for the tubular elements 25 is shown in Fig. 4 where each tube 25 is shown provided with an end closure 25b to which the conducting wire 28 is welded or otherwise secured in such a manner as to make a good electrical connection therewith.

A snap switch 50 is shown close to the apparatus as a convenient means for controlling the electric current which heats the tubes 25 when desired.

The current flows from an outside source through the wire 40 connected to one of the tubes 25, thence through the body of said tube to the lower end of the tube where the wire 28 is secured preferably to the closed lower end of the tube as shown in Fig. 4.

Referring to the complete wiring as shown in Fig. 1, the current first flows through the wire 41 to the corner tube 25, of the adjacent U-shaped set of tubes 25 and 26, thence through one of the wires 40 to the next set of tubes, and in this manner progressively throughout the heating elements to the opposite side and then across to the next row of heating elements, and so on until all the heating elements are provided for. A return wire 42 completes the circuit.

The wires 40 connect the tube 25 of one of the inverted U members with the adjacent tube 25 of the next U member in the row, and at the ends of the device the parts are arranged as shown in Fig. 2 to complete the electric circuit through all the inverted U-shaped members.

Considering the invention as a method or process, the various steps thereof are as follows:

The conical containers 9 are first supplied with the liquid or semi-liquid confection for instance, a creamy substance to be congealed in them. Then the transfer member D is put in place upon the mold member in the position shown in Figs. 1 and 2 wherein the lower end portions of the tubular elements 25 are immersed in the liquid or semi-liquid confection, it being understood that the switch 50 is at such time in the off position preventing said tubular elements from premature electrical heating. The congealing liquid 47 is now permitted to freeze the confections causing them to adhere not only to the tubes 25 but also to the receptacles 9. Then, by means of the handles 43, the mold member C is removed from the brine 47 and transferred to a bath of warm liquid whereby the confections are loosened from the containers 9, but remain firmly fixed to the tubes 25. This warm bath may be in a container similar to that shown in Fig. 2 for the brine. As soon as the confections have thus been loosened from their containers, the handles 44 of the transfer member are manually grasped and said member together with the tubes 25 and the confections frozen to them, is lifted thus withdrawing the frozen confections from their containers, and then said confections are all together transferred to and immersed in an edible coating bath which may be contained in a receptacle like that indicated in Fig. 2.

After the confections have thus been dipped into the coating substance they are at once withdrawn therefrom by the same set of handles and then the entire unit is brought above a battery of packing receptacles properly spaced for the reception of the individual confections, whereupon the electric current is momentarily turned on by means of the switch 50 thus causing the tubes 25 to be heated sufficiently to cause the confections to drop by gravity into the packing containers, leaving a perfectly formed socket in each confection which may be utilized by the consumer for inserting therewithin a handling means.

I claim:

1. In combination, a mold member comprising a plurality of liquid containers for containing confections being congealed, supporting means removably mountable on said mold member, a plurality of elongated tubular elements carried by said supporting means and projecting into said containers when said supporting means is mounted upon said mold member, there being conductors within said tubular members which are electrically connected with their lower ends and which above their lower ends are insulated therefrom, the aforementioned supporting means sustaining said tubular elements in an insulated manner, and means to supply an electric current to said tubular elements at points spaced a substantial distance above their lower ends thereby to heat by electrical resistance said conductors and thus to heat by radiation said tubular members in order to release from them the frozen confections.

2. In a device of the kind described, a frame, a set of downwardly directed tubular members mounted upon and insulated from said frame, said members being arranged in pairs each of said pairs being of an inverted U-shape and consisting of two sections which are separated by insulating material in the top portion of the inverted U, an electrical conductor led through substantially the entire length of said U, and means to supply electric current to said conductor thereby to heat said tube for the purpose specified.

3. The method of coating a frozen confection and providing within it a socket to receive a handling means, which consists in supporting said confection in a liquid form within a container, supporting an elongated downwardly projecting carrier element above said container in position to have the confection congealed therearound and so as to adhere thereto, then congealing said confection, then transferring it by means of said carrier element to and dipping it into an edible coating substance, then transferring the frozen confection after coating to a wrapper or other receiver, and then heating said transferring element in order to cause the coated frozen confection to fall therefrom.

4. The subject matter of claim 3 and, the heating of said transferring member being produced by the resistance of an electric current passing through a conductor associated with said transferring member.

ABRAHAM BALIAN.